United States Patent Office 3,514,051
Patented May 26, 1970

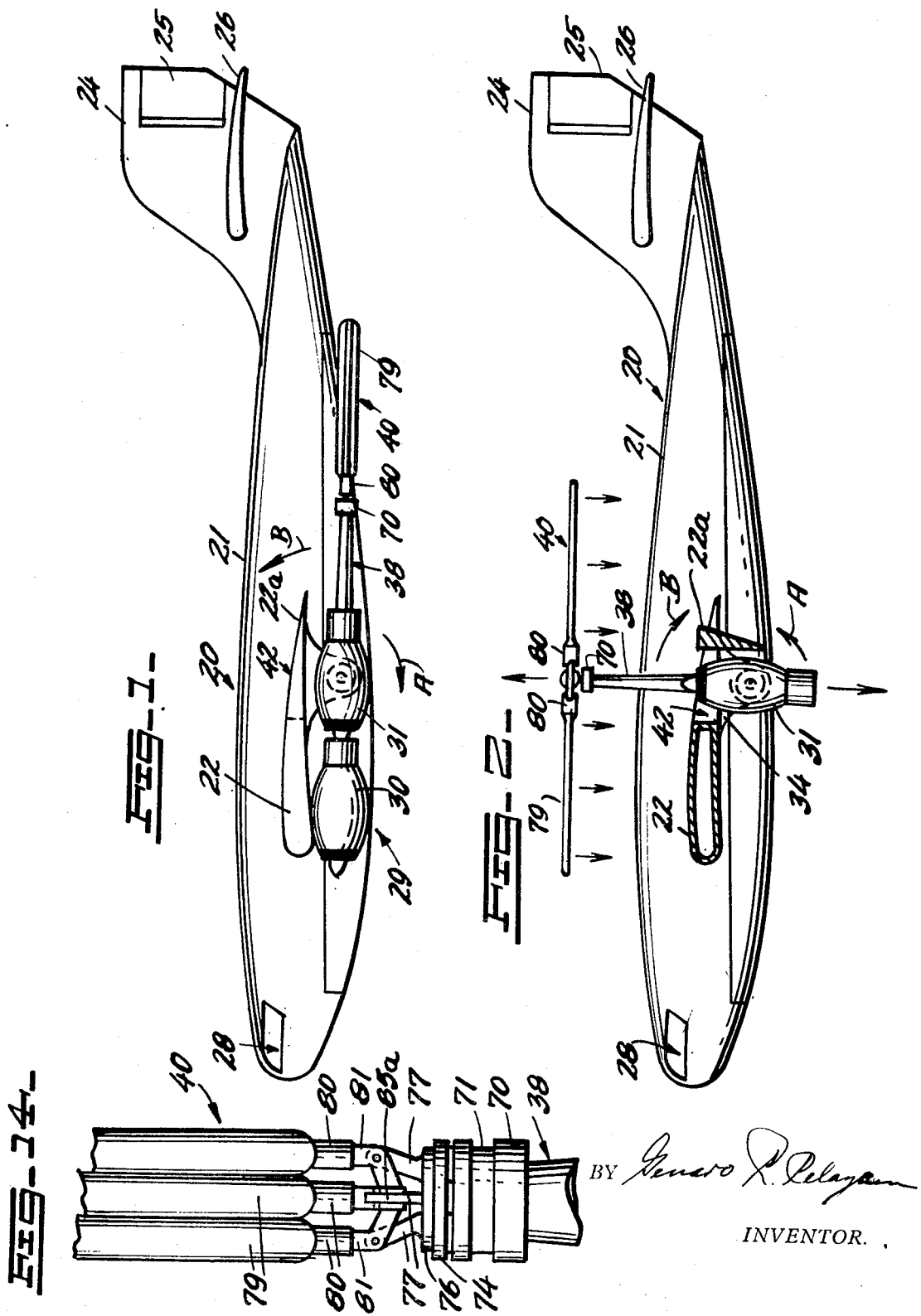

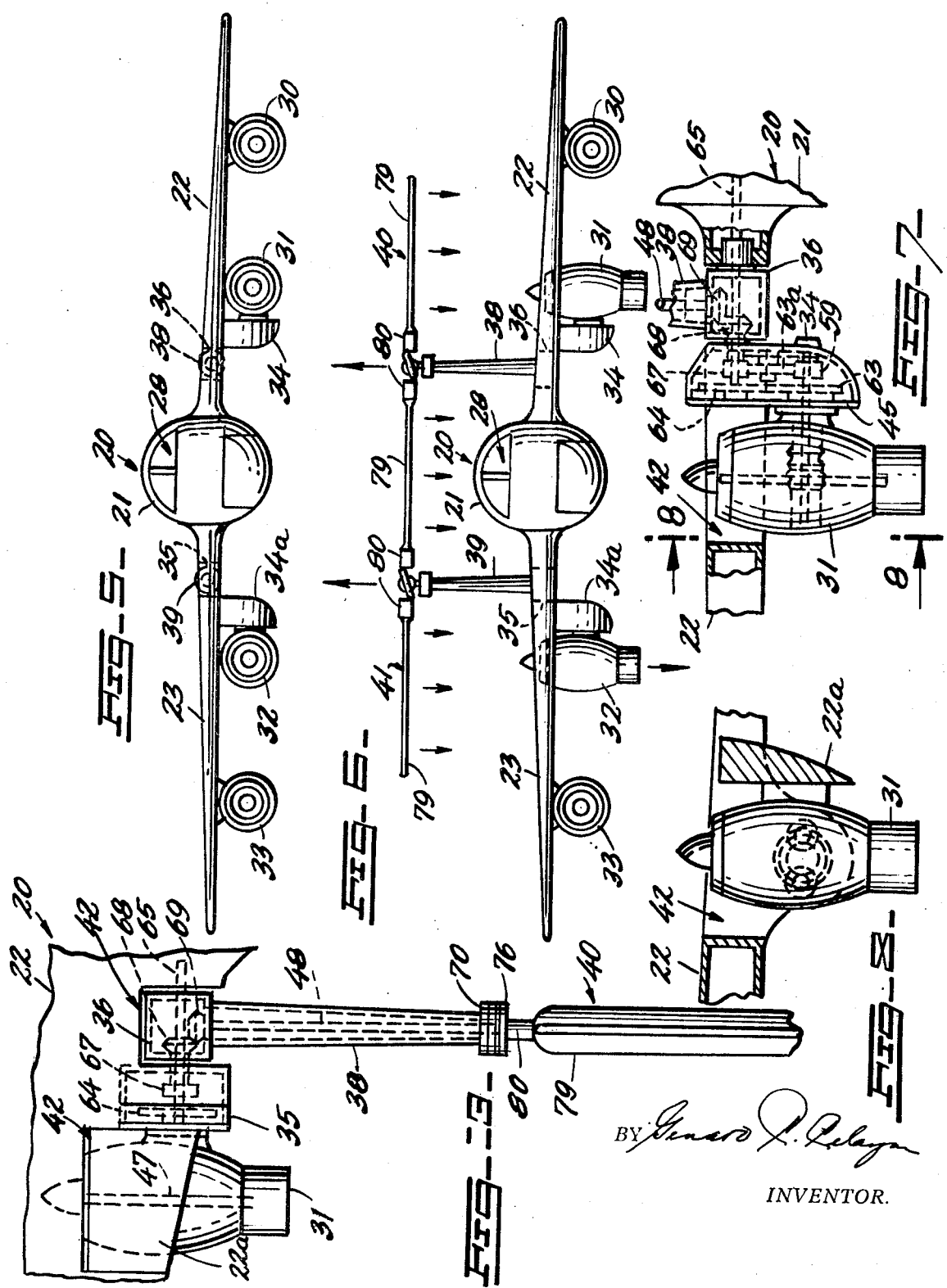

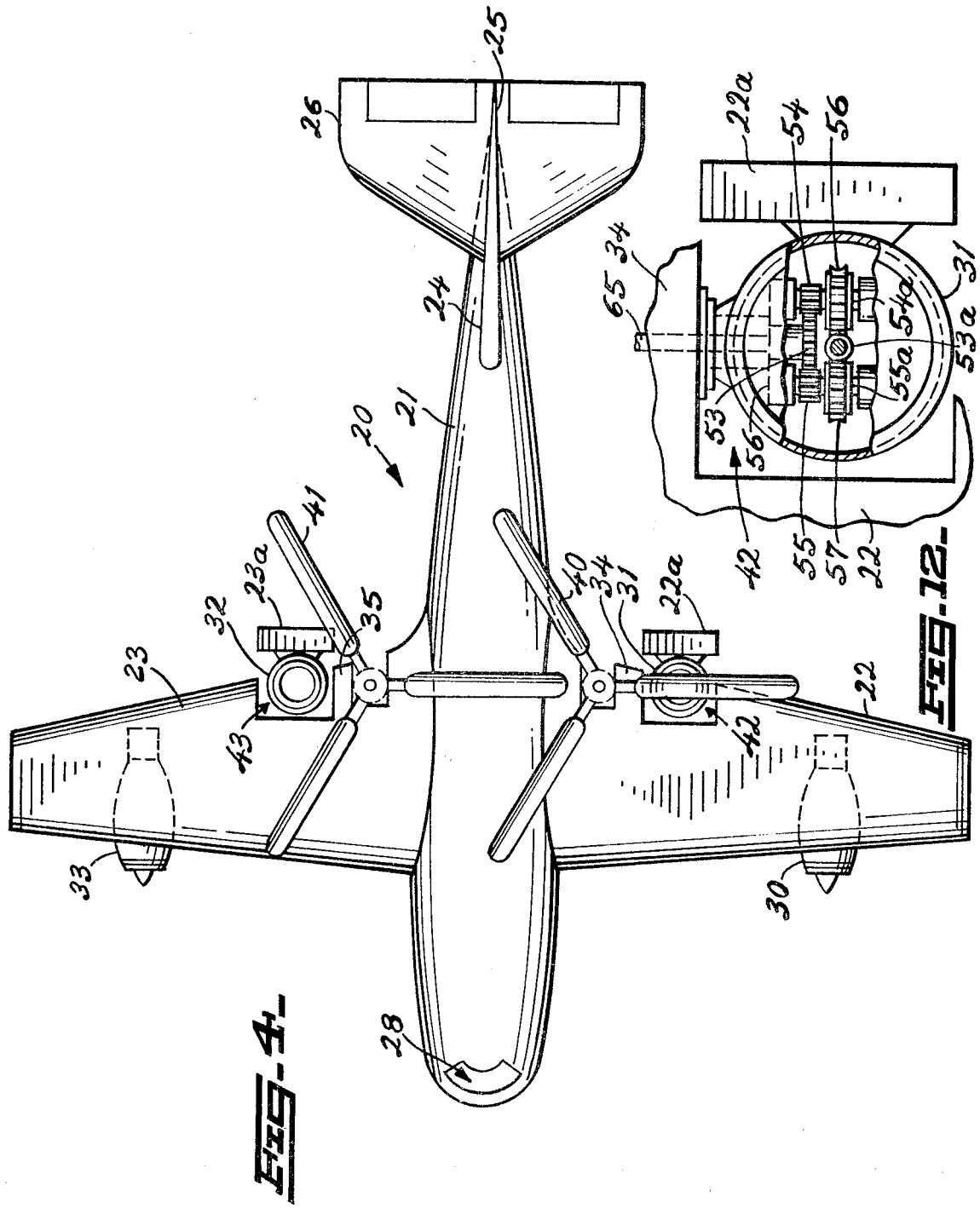

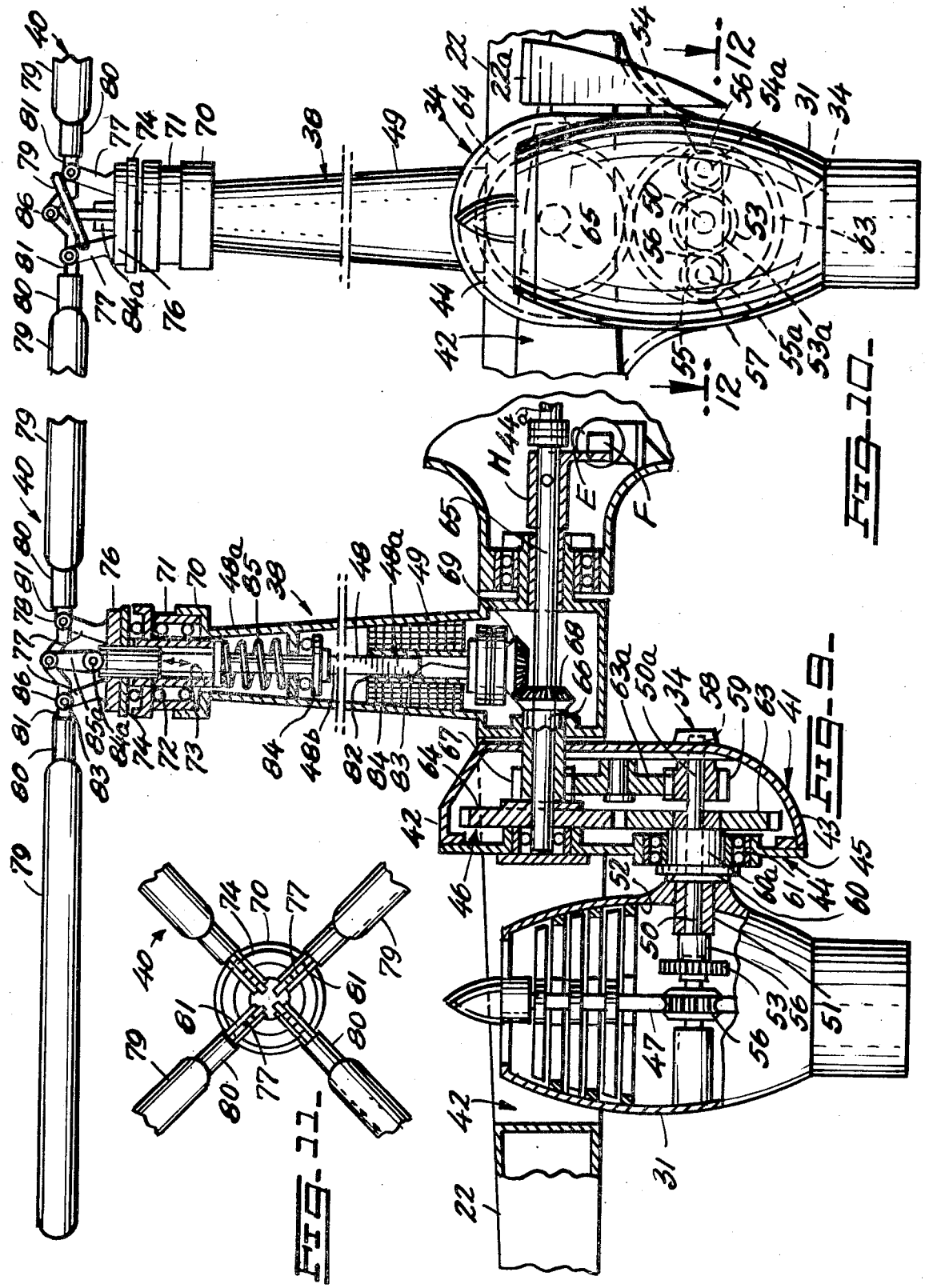

3,514,051
VERTICAL TAKE-OFF AND LANDING AND ENGINE MEANS THEREFOR
Genaro C. Celayan, 317½ N. Beaudry Ave., Los Angeles, Calif. 90012
Filed Oct. 30, 1967, Ser. No. 679,599
Int. Cl. B64c 27/30
U.S. Cl. 244—7          6 Claims

ABSTRACT OF THE DISCLOSURE

A vertical lift aircraft has foldable rotor blade arrangements tiltably mounted for rotation with the conventional prime-moved aircraft engine, such as a turbo jet engine, on both wings on opposite sides of the aircraft fuselage. The rotor blade arrangements are rotated in the wing structures with the prime-mover engines to an upright position with the rotor blades extended to be driven through a selectively engageable coupling from the main shaft of the aircraft engine to provide a vertical lift in addition to that provided by the aircraft engine itself during vertical take-offs and landings. For level flight, the rotor blade arrangement is disengaged from rotation by the main shaft at the engine, and rotated with the blades folded along with the engine to a horizontal position.

---

The present invention relates to improvements in aircraft which may rise and descend vertically and also may move horizontally in normal flight over the ground. In particular this invention relates to such aircraft which may utilize the power-mover normally used in flying the craft horizontally also for raising and lowering the craft vertically. In addition the present invention relates to aircraft which may receive assist from conventional type rotor blades in conjunction with a jet engine.

Applicant is aware that the aviation industry at large has under development a number of aircraft which are provided with means for vertical take-off and landing. There is, for instance, a craft which by means of the utilization of one or more jet engines (vertically mounted) may rise vertically under the reaction of the jet. Other craft in this category are provided with propeller-driven devices in the wings which can be swiveled (from a horizontal to a vertical position) for the vertical take-off. The propeller blades in the latter are mounted to rotate in a circular frame or in a flanged ring. There are also available vertically rising fan-propeller and fan-jet driven aircraft. However, all of the aforesaid devices have many disadvantages and one fault which is in common with all, i.e. they are of low overal efficiency. They can hardly raise their own weight (and the equipment), and must utilize huge amounts of energy (H.P.) in the lifting process. In addition, the lift producing equipment are huge and bulky. The present invention will tend to eliminate the above enumerated disadvantages. It will provide a simple and compact prime-mover engine which shall be used both as a flying device and as a device to create a vertical lift.

The "vert-o-craft" of the present invention incorporates the best advantages of a jet engine, of the autogiro, and the helicopter rotor. Moreover, the vertical lift gear may be readily housed away when it is not used for the lakeoff, and landing. A further advantage of the present invention is its safety, the ease of operation and the low cost of production.

Accordingly, the primary object of the present invention is to provide a device for vertical lift in combination with the aircraft's prime-mover with both devices operating in unison.

Another object of the present invention is to combine the lift capabilities of a jet engine with the lift capabilities of a helicopter rotor.

Another object of the present invention is to provide a power-plant which is a combination jet and helicopter rotor, with the jet's main shaft being coupled directly to the drive shaft of the helicopter's rotor.

A further object of the present invention is to couple the main shaft of the jet with the drive shaft of the rotor of the helicopter by means of a gear reduction.

Another object of the present invention is to provide a means for mounting the jet engine to the wings in such a manner as to pivot in a vertical plane thereto, and means for pivoting the engine from its normally horizontal to a vertical position.

Another object of this invention is to provide a helicopter rotor and its shaft that is pivotable from a vertical to a horizontal position, and means for spreading open or unfolding the helicopter blades when the rotor shaft is in the vertical position and folding the rotor blades when the shaft is in the horizontal position.

A further object of the present invention is to mount said jet engine adjacent to said helicopter shaft in such a manner as to permit the jet engine to be pivoted from its normally horizontal position to a vertical position together and in unison with the pivoting of said helicopter shaft, the shaft being pivoted from its normally horizontal position to the vertical position relative to the vertical plane.

An additional object of the present invention is to pivot said engine and said helicopter shaft in a counterclockwise direction in respect to one another so as to permit said helicopter shaft to move towards the rear end of said engine, when said engine is facing forward towards the direction of travel.

Another object of the present invention is to provide means for folding and unfolding the blades of said helicopter, said device comprising a coupling which may be operable in a mechanical or in an electrical fashion.

An additional object of this invention is to provide means for a single combination (one jet motor and one helicopter rotor) or for multiple combinations (a pair of jet motors and helicopter rotors), with each respective combination mounted on either side of the plane's fuselage.

A further object of the present invention is to provide and to operate two helicopter rotors together and in unison with one another, however, each rotating in a counterclockwise direction so as to eliminate torque.

Another object of the present invention is to provide means allowing said helicopter blades to be unfolded only when the rotor shaft reaches its full vertical position.

A further object of the present invention is to provide a mechanism for vertically pivoting the jet motor and the helicopter shaft together and simultaneously, and coupling means for operating the rotor blades simultaneously with the operation of said jet shaft, said means being operable from the cockpit of the aircraft and at the aviator's will.

This invention also consists in certain other features of design and construction, and the combination and arrangement of several parts to be hereinafter fully described, illustrated in the accompanying drawings and specifically pointed out in the appended claims.

In describing the invention in detail, references will be had to the accompanying drawings where like character numerals denote like or corresponding parts throughout the several views, in which:

FIG. 1 is a side elevational view of a preferred embodiment of the present invention with the engine and rotor shaft and blades in the horizontal position for level flight;

FIG. 2 is a side elevational view the embodiment of FIG. 1, shown in partial cross-section with the engine and rotor shaft and blades in the vertical position for vertical ascent or descent;

FIG. 4 is a top elevational view of FIG. 2;

FIG. 5 is a front elevational view of FIG. 1;

FIG. 6 is a front elevational view of FIG. 2;

FIG. 7 is a section through the mechanism used to operate the rotor blades;

FIG. 8 is a section on the line 8—8 of FIG. 7;

FIG. 9 is a section through the operating mechanism necessary to operate the lift rotors from the jet engine;

FIG. 10 is a side elevational view of FIG. 9 showing the manner in which the lift rotors are mounted to the aircraft's fuselage.

FIG. 11 is a top elevational view of the lift rotors showing the manner in which the rotor blades are mounted to the vertical shaft;

FIG. 12 is a section taken on the line 12—12 of FIG. 10, showing the manner in which the rotor blades are being driven from the main shaft of the jet engine;

FIG. 13 is a top elevational view of FIG. 7, showing the jet motor in its normal horizontal position with the rotor blades folded; and FIG. 14 is an enlarged fragmentary view showing the manner in which the rotor blades fold when not in use.

Figure 3:
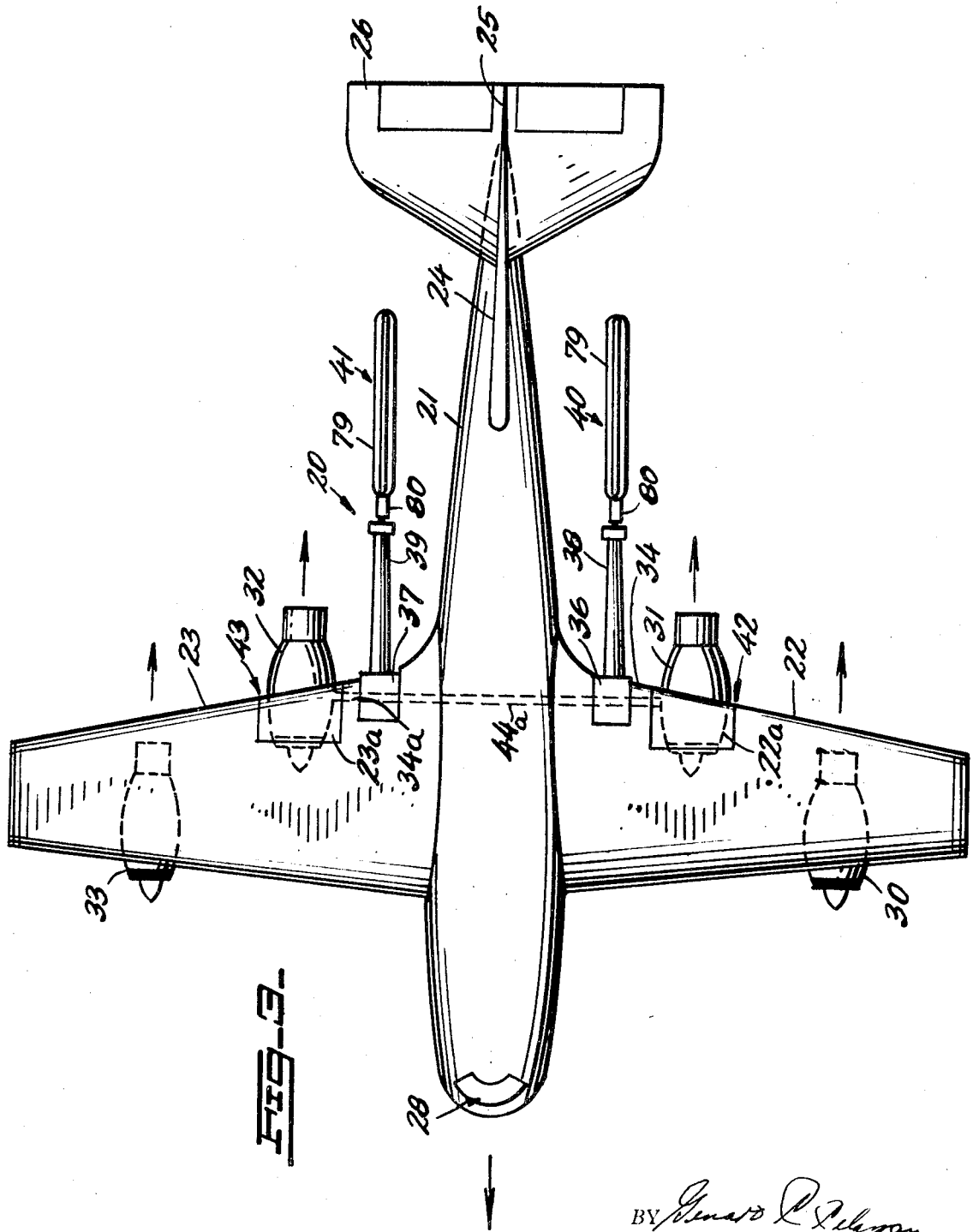
FIG. 3 is a top elevational view of FIG. 1.

It is understood that the present form of disclosure is merely for the purpose of illustration, and that there might be various modifications thereof, without departing from the spirit of the invention as herein set forth.

Referring now more particularly to the drawings, the aircraft 20 constructed in accordance with the present invention, as best seen by reference to FIGS. 1, 2, 3 and 4, having a fuselage 21; wings 22 and 23, vertical stabilizer 24; with rudder plane 25 horizontal stabilizers 26 and 27 a cock-pit section 28; an under surface 29, and four jet engines 30, 31, 32 and 33. The inboard engines 31 and 32 are attached by pivotable mounts 34 and 35 to rotatable, armatures 36 and 37, respectively, on which are also mounted pylons 38 and 39, each carrying a set of rotor blades 40 and 41, respectively.

Referring now to FIGS. 1, 2, 3 and 4 the jet engine 31, the pylon 38 and the rotor blades 40 are shown in both horizontal and vertical positions. In the horizontal position, as shown in FIGS. 1 and 3, the rotor blades 40 are folded together in their non-operative position, while in the vertical position, as shown in FIGS. 2 and 4, they are unfolded in their normally operative position ready for vertical take-off or landing.

Likewise the inboard pair of jet engines 31 and 32, are pivotable from their normally horizontal position corresponding to the position as shown in FIGS. 1 and 3; to a vertical position as shown in FIGS. 2 and 4.

The jet engines 31 and 32 are rotatably journalled on the engine mounts 34 and 34a in pivot assemblies 42 and 43, respectively, that they also include movable sections 22a and 23a. When the jet engines are in their horizontal position, as shown in FIG. 3 the wing sections 22a and 23a form the rear part of the air-foil cross-section of the wings 22 and 23. On the other hand, with the jet engines in the vertical position with their intakes upwards, the wing sections 22a and 23a pivot engines out of contact with the surrounding wing, as shown in FIG. 4.

Both jet engines 32 and 33 are mounted upon a single rotatable shaft 44 which permits both engines to be pivoted together, in unison and simultaneously and allows the rotor blades 40 and 41 to unfold simultaneously, and operate in unison.

Referring now to FIGS. 9, 10 and 11, which illustrate the vertical lift rotor 20, and its coupling to the jet engine 31 the mount 34 has a housing 41, the side 44 toward the engine fitted with a cover plate 45, which by means of machine screws (not shown) may be securely held to the housing 41 so as to enclose a gear mechanism 46 which permits the transfer of the torque from a main drive shaft 47 in the jet engine 31 to a rotor shaft 48 in pylon 49.

The gear mechanism 46 in the housing 41 (see FIGS. 9 and 10) is driven by the transversally mounted shaft 50 journalled to rotate in a bearing member 51 formed in jet engine housing 52. The shaft 50 extends on either side with a spur gear 53 on one end in direct mesh with a pair of secondary gears 54 and 55, respectively. The pair of gears 54 and 55, are journalled on supporting casting 56 to rotate freely upon a pair of shafts 64a and 55a. The shaft 54a holds a worm gear 55b, and the shaft 55a carries a worm gear 55b. Both gears 55a and 55b mesh with another worm gear 57 which is held keyed to the jet motor shaft 47. By means of the worm gear 57 the worm gears 55a and 55b, the spur gears 54 and 55, and the spur gear 50, the torque is transmitted from the shaft 47 to the transversally mounted axle 50.

The opposite end 50a of the shaft 50 passes through the bearing 51 and is held in a supporting bearing 58, which is an integral part of the housing 41. The shaft end 50a extends through the bearing 51 to mount a spur gear 59 to rotate with the shaft end 50a. Moreover, the shaft 50 passes through a hub-shaped member 60 mounted to rotate within the supporting ball bearing 61, which is housed under the cover plate 45. One end of this hub is secured to the engine housing 52 and the opposite end of the hub 60a carries upon its shoulder 62 a large spur gear 63, which is in mesh with a similar spur gear 64 mounted to rotate with a secondary transverse shaft or axle 65. In addition, a hub member 66 is journalled on the shaft 65 to turn freely upon it as an idler. Upon its extreme end the hub 66 carries a spur gear 67, while at the opposite end the hub 66 carries a bevel gear 68. A secondary bevel gear 69 is secured to the end 48a, of the vertical rotor shaft 48, to mesh with the bevel gear 67.

In reference to the pair of spur gears 63 and 64, respectively, it can be seen that an idler gear 63a may be interposed between the two former gears (63 and 64) so as to make possible the transference of torque from the main shaft of the jet engine 31 to the rotor shaft 48.

The vertical pylon 49 is suspended over and above the gear box 36 (see FIGS. 1, 2 and 3) in such a manner as to permit it to swivel freely 90 degrees from the vertical to the horizontal. The upper section 48a of the pylon 48 has a circular flanged member 70 which supports a circular ring 71. The thrust bearing 72 and the rotating bearing member 73 are supported in the flanged ring 71. The upper end 48b of the vertical shaft 48 passes through the sleeve 73 and is supported to slide in the direction shown by the arrow. Moreover there is mounted a thrust bearing 74, over the shaft end 48b, which by means of the thrust plate 75 guides the rotor blade armature 76 in its rotation.

The rotor armature 76 consists in the main of the upright supports 77, which rise vertically from the thrusty plate 76 and may carry on their uppermost extremities the bearings 78. Rotor blades 79 have hubs 80 with crank arm extensions 81 pivotably mounted on the supports 77 by pins 86 in the bearings 78 with their inner ends attached by a shaft extension arm 85a so as to cause the folding and the unfolding of the rotor blades with the reciprocal movement of the shaft 48.

The sliding vertical shaft upper end 48b extends through the sleeve bearing member 84 to be connected by the stud 84a to a shaft extension arm 85a, the upper end of which is coupled to the crank arm extensions with pins 86.

The vertically mounted rotor shaft 48, at the lower end thereof, at 48a, is of a square-shaped cross section and can be housed within the sleeve 82 which in its turn has an elongated square opening into which the shaft 48a is fitted to slide freely. The sleeve 82 is secured to the electric clutch member 83 which has two individual disks; one disk may be secured directly to the sleeve 82 (to turn with it) while the other disk may be rotated by the meshing bevel gear 69. When the latter disk is rotated by the bevel gear 68, it rotates the sleeve 82 and the rotor shaft 48. The electric clutch 83 can be operated by the mere pressing of an electric switch, manually or automatically operable from the aviator's panel.

Further, there is provided (within the pylon 38 at its lower section) an electrically operable solenoid coil 84 (shown in section) which encircles the sleeve 82 to permit its rotation within a circular opening through the solenoid coil 84. When the coil 84 is energized, the magnetic forces generated by the coil pull the shaft end 48a into the coil to fold the rotor blades 79. In other words, the shaft end 48a serves as the iron core in a solenoid coil. Accordingly, when the current in the coil 84 is discontinued, the shaft end 48a can move outwardly or retract causing the blades 79 to unfold. To insure proper operation in the mechanism aforesaid, the shaft end 48a, at 48b, should be provided with a circular flange which is made fast to the shaft and is under the influence of the compression spring 85. The spring 85 tends to move the rotor shaft 48 upwardly, while the action of the solenoid coil 84 moves the shaft 48 downwardly relative to the fuselage of the aircraft.

OPERATION

The main object of the present invention concerns itself with a flying vehicle which may be provided with a conventional type prime-mover for normal level flight, and with an accessory means for vertical take-off and landing. The combined operation may be successfully attained on one hand through the utilization of a thrust created by the vehicle's prime-mover engine, and on the other hand with an additional thrust which may be provided through the utilization of a pair of bladed rotors.

However, it is of the utmost importance that the power-drive in question is simple in its operation as to reduce friction, and to maintain a high rate of efficiency in its overall performance. The vehicle's prime-mover is primarily of standard design and is able to provide a normal flying radius. The prime-movers may be propeller driven engines or jet engines of conventional design, and may be mounted to the vehicle's wings in such a fashion as to allow tilting of the prime-mover; from the horizontal to the vertical plane. This implies that a jet engine which is mounted to the vehicle's fuselage in a horizontal plane, may be tilted or swiveled from its original horizontal position to a vertical position (perpendicular to the ground). Thus the thrust of the prime-mover standing upright may be utilized to create a partial lift for the vehicle. However, this thrust coefficient is not sufficient to lift the vehicle completely off the ground and may be augmented by an additional lift which may be provided from blade rotors (which are mounted on the vehicle's fuselage upon vertical pylons). The operation of the bladed rotors aforesaid will create additional lift, augmenting the lift of the prime-mover engines, so that the combined thrust momentum created by both means may produce sufficient thrust to raise the vehicle clear off the ground, straight up.

It is quite possible to operate the prime-mover engines and the bladed rotors independently from one another. The bladed rotor could be operable by an engine separate from the prime-mover. However, such a construction will weigh a lot and add considerably to the total weight of the vehicle, making it too heavy for a vertical lift. To eliminate the extra weight, the present invention provides coupling the shaft of the prime-mover engine with the shaft operating the bladed rotor (the shaft 50 to the shaft 48, see FIG. 9).

In such an arrangement of parts the momentum or the torque produced by the prime-mover can drive both, the jet's compressors and the bladed rotor simultaneously. It is clear that under these conditions the jet motor must produce sufficient energy for both. To do so the prime-mover will have to be fed extra fuel and work under heavy load. However, the prime-mover will not be expected to operate under overload long periods of time, only long enough to lift the craft and to lower it in a vertical path. Appropriate gear reduction will be required to reduce the high speed of the prime-mover shaft 50 to the lower speed of the bladed rotor shaft 48.

For the take-off the aviator in the cabin turns a switch (not shown) which energizes a motor operated pump which delivers oil under pressure to the hydraulic cylinder E (see FIG. 9). The cylinder by means of the plunger shaft F operates the lever arm G, with the latter being secured to the shaft 50, through the medium of the bushing or the hub member H. The operation of the shaft 65 swings it in an arc of 90 degrees so as to rotate the large gear 64 which is in mesh with the large gear 63. The gear 63 is held upon the bushing 60 which is secured to the motor frame 52. Accordingly, the operation by the hydraulic cylinder tilts the jet motor 90 degrees from the horizontal so as to move it from its normally horizontal position to the vertical position, substantially as shown in FIGS. 9 and 10, inclusive.

The lower end of the supporting pylon 38 has of its gear housing fixedly attached to the shaft 50. Accordingly, the pylon 38 will tend to swivel or hinge in an arc together with the prime-mover jet; when the jet 31 moves from its normally horizontal to the vertical position the pylon 38 will do likewise. However, while the jet motor will tend to pivot in the direction indicated by the arrow A, the pyon 38 pivots in the opposite direction indicated by the arrow B (see FIGS. 1 and 2, inclusive). The pylon 38, when not in its operative position is housed or located in a line parallel to the craft's fuselage, and in a straight line with the line of flight of the aircraft. It can be seen that rotor blades can be folded automatically during the travel of the pylon from the vertical to the horizontal, and vice versa. This operation is accomplished by the mechanism described in FIGS. 9 and 10. It must be noted, however, that the coil spring 85 forces the shaft 48 downwardly to fold the rotor blades in the manner shown in FIG. 4.

When the pilot desires to utilize the services of the vertical lift, an electric switch is depressed (not shown) which energizes the solenoid coil 84, to move the shaft 48 in an upward direction so as to unfold the rotor blades in a manner shown and described in FIG. 9. This switch may be provided with a relay which will not permit the operation of the coil or the unfolding of the rotor blades unless the pylon has reached its maximum rise. This safety feature would prevent damage to the rotor blades should they unfold prematurely.

A careful examination of the foregoing description in conjunction with the invention as illustrated in the drawings, will enable the reader to obtain a clear understanding of the alleged features of merit and novelty, sufficient to clarify the construction of the invention. Minor changes may be resorted to, as actually no departure from the invention is made.

Having described my invention what I claim is the following:

1. In a flying vehicle having a fuselage and a pair of wings, an arrangement for flying said vehicle in level flight and for moving said vehicle vertically comprising: a pair of prime-mover engines with one engine in said pair being mounted in each wing, a main shaft in each of said prime-movers, means for mounting each engine to permit pivoting each engine from its normally horizontal position to a vertical position relative to the fuselage, means for creating a vertical thrust including a pair of rotor blade sets mounted upon pylons pivotally supported on said wings, with one pylon in said pair being mounted over each wing, a rotating shaft in each pylon connected to each rotor blade to rotate the blade sets to create a vertical thrust, and gear means to connect the main shaft in each engine to the shaft in each pylon, and means to permit raising and lowering said pylons, said pylons being pivoted to a vertical position when said engines are pivoted into a vertical position for moving said vehicle vertically, and said pylons being lowered to a horizontal position when said engines are pivoted to a normal horizontal position for level flight.

2. In an aircraft having a fuselage, a pair of wings, a pair fo jet engines mounted on each wing, each of said engines having a drive shaft, one engine from each pair being suspended at the tip-end of each wing, and the other engine in said pair being suspended adjacent and near the fuselage of said aeroplane, the vertical lift arrangement cimprising: means for pivoting the engines adjacent said fuselage 90 degrees from the horizontal to a vertical position, and rotor means to create a vertical thrust, said means comprising an upright pylon, a rotor armature shaft in said pylon, blades foldably affixed to ritate with said armature shaft, and means for rotating said armature shaft including a direct gear connection between said drive shaft of said engines and said armature shaft, and means to swivel said pylon from a horizontal to a vertical position in unison with said engines.

3. A flying vehicle provided with means to create a vertical lift having a fuselage and a pair of wings, comprising: a pair of jet motors in said vehicle to fly said vehicle; a pair of rotor blade sets to lift said vehicle vertically off the ground, said rotor blade sets being foldable together when the lift is not desirable; one jet motor in said pair and one rotor blade mounted in each wing, each jet motor having a main drive shaft and each rotor blade set having a rotor shaft, gear means to connect the drive shaft in each jet motor to the rotor shafts to rotate the blade sets, and means to pivot said motors and said rotor blade sets from a horizontal position, with said engine facing forward and said rotors folded away when flying said vehicle in level flight to a vertical position with said motors facing vertically with said rotor blades unfolded and when said vehicle is rising or landing vertically.

4. In an aircraft having vertical lift capabilities and having an elongated fuselage with a pair of wings secured on either side of the fuselage mounting jet engines to fly said vehicle, the improvement comprising: a pair of jet engines, with one jet engine pivotally mounted in each wing, means for creating a vertical thrust comprising rotor blades mounted upon a pair of supporting pylons, with one pylon in said pair mounted to each wing adjacent to each jet engine, a main drive shaft in each jet engine, a rotor shaft in each pylon for rotating said blades, gear means coupling each rotor shaft to be driven by the main drive shaft of the adjacent jet engines; means provided for selectively pivoting each jet engine and each pylon in unison from a normally horizontal to a vertical plane position.

5. The combination according to claim 4; said means for pivoting said engines and pylons, comprise; a first pivot shaft upon which said engine is mounted, and a second pivot shaft upon which each pylon is mounted, gearing means provided between said first and second pivot shafts for producing rotation in opposite directions; hydraulic means for rotating said second pivot shaft to pivot said jet engine between its normally horizontal position and a vertical position and to pivot said pylon from its normally vertical position to a horizontal position.

6. In a vertical lift aircraft having elongated fuselage and wings mounted on either side of said fuselage, and jet engines mounted on each of said wings with each engine having a drive shaft, the improvement comprising: means for creating a vertical thrust operable independently of the forward flying of said vehicle, said means comprising a pair of bladed rotors mounted to rotate upon a pair of upright pylons, with one pylon in said pair being mounted on either side of said fuselage adjacent a jet engine, rotor shafts in said pylons to operate said bladed rotors, gear means for coupling the drive shaft of each engine to rotate the adjacent rotor shaft; said means for creating a vertical thrust also including means for pivoting said jet engines and said pylons in unison from a horizontal to a vertical position; and means for folding the rotor blades in said pylon when said pylon is moved from its normally vertical position to its horizontal position and for unfolding said blades when said pylon is moved from its horizontal to its normally vertical position.

References Cited
UNITED STATES PATENTS

| | | | |
|---|---|---|---|
| 3,089,666 | 5/1963 | Quenzler | 244—7 |
| 3,254,725 | 6/1966 | Higgins | 244—7 |
| 3,368,778 | 2/1968 | Wilde | 244—6 |

MILTON BUCHLER, Primary Examiner

J. L. FORMAN, Assistant Examiner

U.S. Cl. X.R.
244—6, 12, 17.27